United States Patent [19]

Leininger et al.

[11] 4,279,016
[45] Jul. 14, 1981

[54] INSTRUCTION PRE-FETCH MICROPROCESSOR INTERRUPT SYSTEM

[75] Inventors: Joel C. Leininger; Floyd R. Bliss, both of Boca Raton, Fla.; Peter T. Fairchild, Woodstock, Ga.

[73] Assignee: International Business Machines Corporation, Armonk, N.Y.

[21] Appl. No.: 50,888

[22] Filed: Jun. 21, 1979

[51] Int. Cl.³ .......................... G06F 3/04; G06F 9/38
[52] U.S. Cl. ................................................. 364/200
[58] Field of Search ... 364/200 MS File, 900 MS File

[56] References Cited

U.S. PATENT DOCUMENTS

| 3,453,600 | 7/1969 | Stafford et al. | 364/200 |
|---|---|---|---|
| 3,811,114 | 5/1974 | Lemay et al. | 364/200 |
| 3,886,523 | 5/1975 | Ferguson et al. | 364/200 |
| 4,041,462 | 8/1977 | Davis et al. | 364/200 |
| 4,050,058 | 9/1977 | Garlic | 364/200 |
| 4,062,058 | 12/1977 | Haynes | 364/200 |
| 4,079,455 | 3/1978 | Ozga | 364/200 |
| 4,097,920 | 6/1978 | Ozga | 364/200 |

OTHER PUBLICATIONS

Booth, R. C. et al., "Microinterrupt via Forced Branch and Link Instruction", IBM Tech. Discl. Bull. vol. 20, No. 1, Jun. 1977, pp. 334-336.

Primary Examiner—Melvin B. Chapnick
Assistant Examiner—Thomas M. Heckler
Attorney, Agent, or Firm—Richards, Harris & Medlock

[57] ABSTRACT

An interrupt system for an instruction pre-fetch microprocessor is provided. The interrupt system includes an instruction address register coupled to a storage address register for holding the next succeeding instruction address to the pre-fetched in a sequence of instructions. A storage address register is provided and is coupled to the instruction address register and is coupled to the storage address register for holding the storage address to be accessed. A first latch receives and stores an interrupt request from one of a plurality of peripheral devices. A second latch, enabling interrupts, is coupled to the storage unit and controlled by instructions from the microprocessor. An interrupt link register stores values of the instruction address register and page information together with arithmetic and logic unit status bits when an interrupt request has occurred from one of the plurality of peripheral devices and an interrupt cycle is executed. The system further includes an interrupt circuit coupled to the first and second latches for inhibiting updating of the instruction address register to a next succeeding instruction. Circuitry is coupled to the first and second latches for inhibiting the operation of the interrupt circuitry following a data storage cycle or a successful branch operation. Circuitry is also provided to cause the next instruction to be executed following an interrupt cycle to be fetched from a predefined word in storage.

24 Claims, 7 Drawing Figures

INSTRUCTION PRE-FETCH MICROPROCESSOR INTERRUPT SYSTEM

TECHNICAL FIELD

This invention relates to computer systems and interrupt mechanisms for a pre-fetch microprocessor system, and more particularly to an interrupt system which permits interrupts to be processed following read and write instructions in addition to unsuccessful branch instructions.

BACKGROUND ART

Communication between an external source and a microprocessor is typically controlled by both the external source and the microprocessor. One type of microprocessor system is an instruction pre-fetch microprocessor in which the microprocessor processes microinstructions in one or two cycles. The microinstructions are fetched from storage in a manner such that the next microinstruction is fetched during the execution of the current instruction.

In such pre-fetch microprocessor systems, interrupts from an external source typically have been masked or inhibited during certain instructions. Microprocessor instructions include arithmetic and logic instructions, input/output (I/O) instructions, storage read and write instructions and branch instructions. Due to the nature of a microprocessor pre-fetch system, previously developed systems have inhibited interrupts from being processed during storage read and write and branch instructions. Such systems have suffered from slow processing of these types of interrupts from the external I/O peripheral devices.

A need has thus arisen for an interrupt processing system for use with an instruction pre-fetch microprocessor system in which the capabilities of instruction pre-fetch are combined with efficient interrupt processing and response. A need has further arisen for an interrupt system in which arithmetic and logic unit status bits and page information is retained during an external interrupt until processing of the interrupt has been completed and wherein this saved data is restored to the processor. A need has further arisen for an instruction pre-fetch microprocessor interrupt system in which the use of less efficient software is eliminated to provide a system in which external interrupts are processed quickly.

SUMMARY OF THE INVENTION

In accordance with the present invention, an interrupt system for an instruction pre-fetch microprocessor is provided. The interrupt system is implemented in a data processing system which includes a microprocessor apparatus operable in cycles and which includes a storage unit for storing data and instructions. The processor is responsive to instructions including page information and is accessed to perform designated operations during a processor program. The processor includes an arithmetic and logic unit having associated status bits. An interrupt device is associated with the processor for processing interrupt requests received by the processor from a plurality of peripheral devices. The system operates in a pre-fetch mode wherein a next succeeding instruction is fetched from the storage unit while a current instruction is being executed. The interrupt system includes an instruction address register coupled to the storage unit for holding the next succeeding instruction address to be pre-fetched in a sequence of instructions. A storage address register is provided and is coupled to the instruction address register and is coupled to the storage unit for holding the next succeeding instruction address during execution of the current instruction. A first latch receives and stores an interrupt request from one of the plurality of peripheral devices. A second latch is coupled to the storage unit and controlled by instructions from the microprocessor. An interrupt link register stores values of the instruction address register and page information together with arithmetic and logic unit status bits when an interrupt request occurs from one of the plurality of peripheral devices. The system further includes an interrupt circuit coupled to the first and second latches for inhibiting updating of the instruction address register to a next succeeding instruction to be pre-fetched during the first succeeding cycle following storage of an interrupt request by the first latch. Circuitry is coupled to the first and second latches and is responsive to a successful branch operation resulting from the next instruction stored in the instruction address register for inhibiting operation of the interrupt circuitry until completion of a successful branch operation. Circuitry further is provided which is coupled to the first and second latches and responsive to storage of data in the storage unit for inhibiting operation of the interrupt circuit until completion of the storage data cycle.

In accordance with another aspect of the present invention, the interrupt circuitry forces an interrupt address to the storage address register for accessing the first instruction in an interrupt routine from the storage unit for use in the next succeeding cycle of the microprocessor. The interrupt circuit further causes the instruction address, page values and arithmetic and logic unit status bits present when the interrupt was executed by the processor to be saved and stored in the interrupt link register. The interrupt circuitry further causes resetting of the page information and arithmetic and logic unit status bits to a zero state and forces a fixed address into the instruction address register.

BRIEF DESCRIPTION OF THE DRAWINGS

For a more detailed description of the present invention and for further objects and advantages thereof, reference is made to the following description, taken in conjunction with the accompanying drawings in which.

DESCRIPTION OF THE PREFERRED EMBODIMENT

Figure 1:
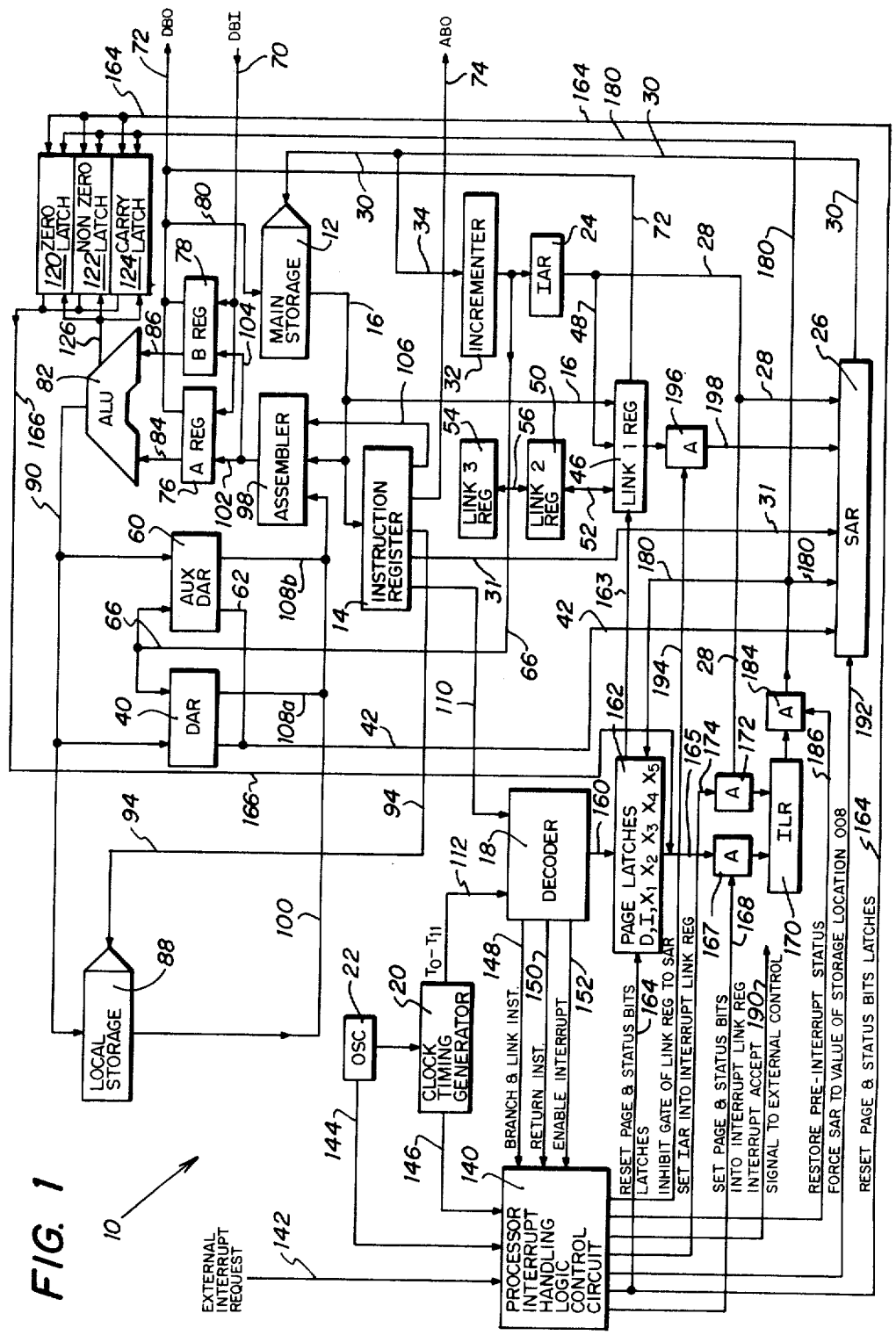
FIG. 1 is a schematic block diagram of a digital data processing system incorporating the interrupt system of the present invention.

Referring to FIG. 1, the major data flow elements and their manner of interconnection for an instruction pre-fetch microprocessor is illustrated. With certain minor exceptions, this same general form of microprocessor construction is shown and described in connection with FIG. 17 of U.S. Pat. No. 4,038,642 entitled "Input/Output Interface Logic for Concurrent Operations" granted to Bouknecht et al on July 26, 1977 and assigned to International Business Machines Corporation of Armonk, N.Y. The microprocessor is generally identified by the numeral 10 and includes a main storage unit 12 for storing program instructions and data. A program is executed by reading its instructions out of main storage unit 12 in a sequential manner and by placing these instructions one at a time into an instruction register 14 via signal line 16.

Microprocessor 10 is controlled by the entry of 16-bit instructions into instruction register 14, wherein bits 0–2 define the instruction mode. Modes 0, 1 and 2 are utilized for arithmetic and logical instructions. Mode 3 is utilized for input/output instructions. Storage read and write instructions require two cycles and comprise modes 4 and 5. Modes 6 and 7 are utilized for branch instructions. The instruction code portion of the 16-bit instructions of instruction register 14 is utilized by a decoder 18 to generate necessary control signals within microprocessor 10. A clock timing generator 20 supplies Clock signals to decoder 18 which is driven by an oscillator 22.

Except for successful branch type instructions, the address of the next instruction resides in an instruction address register (IAR) 24. During execution of the current instruction in the instruction register 14, the next instruction address in IAR 24 is set into a storage address register (SAR) 26 via signal path 28 for purposes of addressing the next instruction in main storage unit 12 via signal path 30. Instruction register 14 is coupled to SAR 26 via signal path 31. The address in SAR 26 is transferred to main storage unit 12 during the execution of the current instruction to provide a pre-fetching of the next instruction. In other words, the next instruction is fetched during the same cycle that the current instruction is being executed. As the address in SAR 26 is transferred via signal path 30 to main storage unit 12, the address is also incremented by an incrementer 32 via signal path 34. The incremented address is set into IAR 24 to provide the address of the next following instruction therein.

If a successful branch type instruction is set into instruction register 14, a branch address is supplied from instruction register 14 or from an instruction addressable data address register (DAR) 40 or an auxiliary data address register (AUX DAR) 60 to SAR 26 via signal path 42 for purposes of fetching the next instruction. If a later return to the original branch point is desired, the contents of IAR 24 will, at this time, be placed in a link 1 register 46 via signal path 48 for enabling a later return to the next instruction following the program point from which the branch was made. A backup or link 2 register 50 is interconnected via signal path 52 to link 1 register 46. A backup or link 3 register 54 is interconnected via signal path 56 to link 2 register 50. Link 2 register 50 and link 3 register 54 provide storage for multiple branch addresses.

For purposes of either reading data from or writing data into main storage unit 12, the storage address is, in these cases, obtained from either DAR 40 or AUX DAR 60 interconnected to DAR 40 via signal path 62. The storage address from the appropriate one of either DAR 40 or AUX DAR 60 is set into SAR 26 via signal path 42. At the same time, this storage address is incremented by incrementer 32 via signal path 66 and the incremented address may be supplied back to the particular one of DAR 40 and AUX DAR 60 from which the unincremented address was obtained. It therefore can be seen that DAR 40 and AUX DAR 60 provide the same address function for data that IAR 24 provides for instructions.

Microprocessor 10 communicates with external sources via three primary busses. These busses include the Data Bus In (DBI) 70, Data Bus Out (DBO) 72 and an Address Bus Out (ABO) 74. The Address Bus Out 74 provides a plural-bit code from instruction register 14 which is used to select the external register or other circuit element which is to have its data placed on Data Bus In 70 or, alternatively, which is to receive the data present on Data Bus Out 72.

Incoming data received on Data Bus In 70 is set into an A register 76 and a B register 78. The data set in A register 76 and B register 78 may then be supplied directly to main storage unit 12 via bus 80 or, alternatively, the incoming data may be supplied to an arithmetic and logic unit (ALU) 82 via signal paths 84 and 86 to be ultimately supplied to a local storage unit 88 via signal path 90. Local storage unit 88 is comprised of a stack of addressable working registers for temporarily holding the data or other operands during their manipulation by microprocessor 10. Local storage unit 88 is addressed by way of an appropriate address field or fields contained in the instruction residing in instruction register 14 via signal path 94. For a typical register-to-register operation, the instruction will include two local storage address fields, one for each of the two operands which are to be involved in the operation.

The data or other operands contained in local storage unit 88 are read out by way of an assembler circuit 98 via signal path 100 and are set into one or the other of A register 76 or B register 78 via signal paths 102 and 104. Instruction register 14 is coupled to assembler circuit 98 via signal path 106. DAR 40 and AUX DAR 60 are coupled to assembler circuit 98 via signal paths 108a and 108b. For the case of an arithmethic add instruction, for example, the contents of A register 76 are added to the contents of B register 78 by ALU 82 and the results are stored back into local storage unit 88. Alternatively, by way of an appropriate instruction from instruction register 14, the contents of A register 76 and B register 78 can be placed on Data Bus Out 72 for transfer to an appropriate register in the hardware to which microprocessor 10 is connected. As a further alternative, the contents of A register 76 and B register 78 may be transferred by an appropriate instruction to main storage unit 12 via bus 60.

When data is read out of main storage unit 12, it is supplied via assembler circuit 98 to A register 76 and B register 78. The data is then supplied via ALU 82 to local storage unit 88 or alternatively, the data may be placed on Data Bus Out 72 from A register 76 and B register 78.

Each instruction set into instruction register 14 includes an instruction code field. This instruction code field is supplied to decoder 18 via signal path 110. Decoder 18 also receives the $T_0$-$T_{11}$ Clock Timing signals from clock timing generator 20 via signal path 112. Decoder 18 decodes the instruction code field and issues the appropriate control signals at the appropriate moments to the various data flow control gates and to the appropriate registers for obtaining the desired movement of data or other operands for that particular instruction in microprocessor 10. When appropriate, decoder 18 also supplies the appropriate signals to ALU 82 for instructing it to add or subtract or perform some other logical function.

Associated with ALU 82 are ALU status latches 120, 122 and 124 interconnected via signal path 126 to ALU 82. ALU status latches 120, 122 and 124 enable the addition of numbers represented by more than four bits in which an add with carry is necessary and provide the mechanism to test the results of ALU 82 operation with branch instructions.

Decoder 18 generates a Branch and Link Instruction via signal line 148, a Return Instruction via signal line 150 and an Enable Interrupt Instruction via signal line 152 which are all applied to processor interrupt handling logic control circuit 140. Decoder 18 generates instructions via signal line 160 to page latches 162 having bits D, I, $X_1$, $X_2$, $X_3$, $X_4$ and $X_5$. Page latches 162 applies an output via signal line 163 to link register 46.

An important aspect of the present invention is the processor interrupt handling logic control circuit 140 to be subsequently described with reference to FIG. 2. Processor interrupt handling control circuit 140 receives an External Interrupt Request signal via signal line 142 from peripheral devices (not shown) associated with microprocessor 10. Processor interrupt handling logic control circuit 140 receives an input from oscillator 22 via signal line 144 and an input from clock timing generator 20 via signal line 146.

The outputs of page latches 162 and ALU status latches 120, 122 and 124 are applied via signal paths 165 and 166 to an AND circuit 167 which sets the page and ALU 82 status bits into an Interrupt Link Register (ILR) 170 under the control of interrupt handling logic control circuit 140 via signal line 168. Processor interrupt handling logic control circuit 140 then generates the Reset Page and Status Bits Latches signal via signal line 164 which is applied to page latches 162 and ALU status latches 120, 122 and 124. Processor interrupt handling logic control circuit 140 also generates the Interrupt Accept Signal to External Control via signal line 190 and the Force SAR to Value of Storage Location 008 signal via signal line 192 applied to SAR 26.

The output of IAR 24 is applied via signal path 28 to an AND circuit 172 which also receives the Set IAR Into Interrupt Link Register signal generated by processor interrupt handling logic control circuit 140 via signal line 174 to apply the contents of IAR 24 to ILR 170.

After the interrupt routine has been completed and processor 10 returns control to the main program, a return instruction will cause the output of ILR 170 to be applied to an AND circuit 184. AND circuit 184 also receives via signal line 186 the Restore Pre-Interrupt Status signal generated by processor interrupt handling logic control circuit 140. The output of AND circuit 184 restores the contents of page latches 162, SAR 26 and ALU status latches 120, 122 and 124 via signal path 180 to the values prior to the interrupt. Processor interrupt handling logic control circuit 140 also generates the Inhibit Gate of Link Register to SAR signal via signal line 194 which is applied to an AND circuit 196 to prevent the setting of the contents of link 1 register, 46, into SAR 26 via signal line 198.

Figure 2:
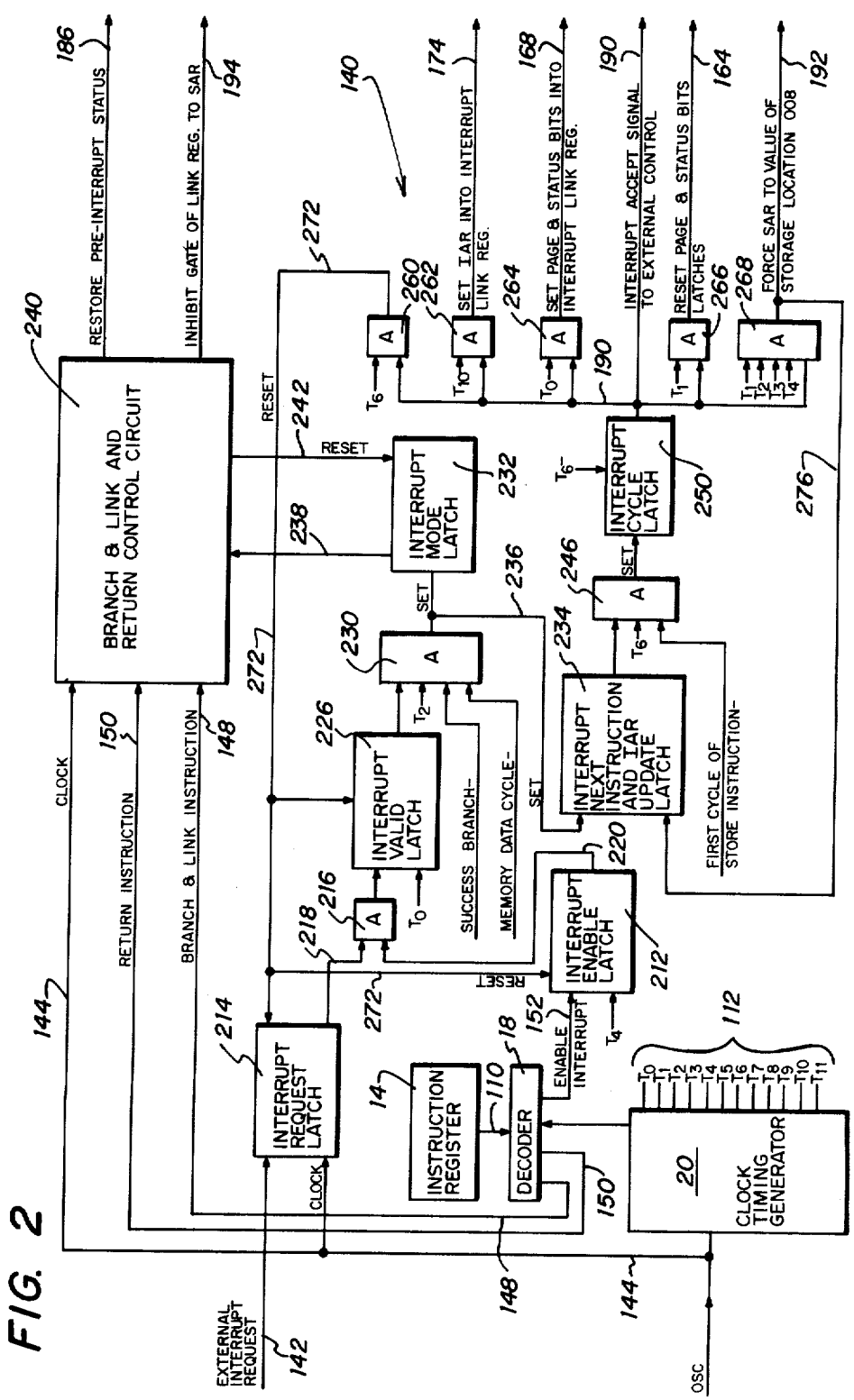
FIG. 2 is a schematic block diagram of the processor interrupt handling logic control circuit block shown in the schematic block diagram of FIG. 1.

Referring to FIG. 2, wherein like numerals are utilized for like and corresponding components previously identified, processor interrupt handling logic control circuit 140 is illustrated. Through operation of instruction register 14 and decoder 18 as previously discussed, the Enable Interrupt signal is generated via signal line 152 and is applied to an interrupt enable latch 212 to set interrupt enable latch 212. Interrupt enable latch 212 also receives the $T_4$ Clock signal from clock timing generator 20. The External Interrupt Request signal is applied to an interrupt request latch 214 via signal line 142 together with the Clock signal generated by oscillator 22 (FIG. 1) via signal line 144. Interrupt request latch 214 may comprise, for example, a dual D positive edge triggered flip-flop without internal reset capability.

The output of interrupt request latch 214 and interrupt enable latch 212 is applied to an AND circuit 216 via signal lines 218 and 220. Interrupt request latch 214 is not automatically reset in the absence of External Interrupt Request signal but is reset by a reset signal to be subsequently described. When an External Interrupt request signal occurs, interrupt request latch 214 is set and held until reset by a reset signal subsequently described.

The output of AND circuit 216 is applied to an interrupt valid latch 226 which is clocked at time $T_0$. The output of AND circuit 216 also causes the clock of microprocessor 10 to be restarted if during any prior operation it had been stopped.

The output of interrupt valid latch 226 is applied to an AND circuit 230 which receives the $T_2$ Clock signal. If microprocessor 10 is not performing a successful branch operation or performing a memory data cycle, the Successful Branch-Signal and Memory Data Cycle-signal are applied to AND circuit 230. The output of AND circuit 230 will then set an interrupt mode latch 232 and an interrupt next instruction and IAR update latch 234 via signal line 236. The microprocessor 10 mode 4 and mode 5 operations require both an instruction fetch and a memory fetch for data. If microprocessor 10 is not performing a Memory Data Cycle or a Successful Branch, at Clock time $T_2$ interrupt mode latch 232 and IAR update latch 234 will be set so that the instruction being fetched while the current instruction is being executed will be lost and the instruction address register 24 will still point to the next sequential instruction.

The output of interrupt mode latch 232 is applied via signal line 238 to a branch and link and return control circuit 240. When the interrupt routine is complete, branch and link and return control circuit 240 generates the Restore Pre-Interrupt Status signal via signal line 186 and the Inhibit Gate of Link Register to SAR signal via signal line 194. Also generated by branch and link and return control circuit 240 is a reset signal which is applied to interrupt mode latch 232 via signal line 242. Branch and link and return control circuit 240 will be subsequently described with reference to FIG. 3.

The output of IAR update latch 234 is applied to an AND circuit 246 which also receives the $T_6$ Clock signal. If microprocessor 10 is not in the first cycle of store instruction, the First Cycle of Store Instruction-signal is applied to AND circuit 246. The output of AND circuit 246 then sets an interrupt cycle latch 250 which also receives the $T_6$- Clock signal. If microprocessor 10 is in the first cycle of store operation, this cycle must be completed and therefore interrupt cycle latch 250 will not be set. The output of interrupt cycle latch 250 generates the Interrupt Accept Signal to External Control signal via signal line 190 and further applies an input to AND circuits 260, 262, 264, 266 and 268.

AND circuit 260 receives the $T_6$ Clock signal to generate a reset signal which is applied via signal line 272 to interrupt valid latch 226, interrupt request latch 214 and interrupt enable latch 212. Interrupt enable latch 212 is reset immediately after an Enable Interrupt signal is received. At Clock time $T_{10}$, AND circuit 262 generates the set IAR into Interrupt Link Register signal via signal line 174 to set the contents of IAR 24 into ILR 170 (FIG. 1). At Clock time $T_0$, AND circuit 264 generates the Set Page and Status Bits Into Interrupt Link Register signal via signal line 168. At Clock time $T_1$, AND circuit 266 generates the Reset Page and Status Bits Latches signal via signal line 164 which is applied to page latches 162 and ALU status latches 120, 122 and 124 (FIG. 1). At Clock times $T_1$-$T_4$, AND circuit 268 forces the value contained in SAR 26 (FIG. 1) to the value of a storage location 008 of main storage 12 via signal line 192 and also applies an input to latch 234 via signal line 276.

Figure 3:
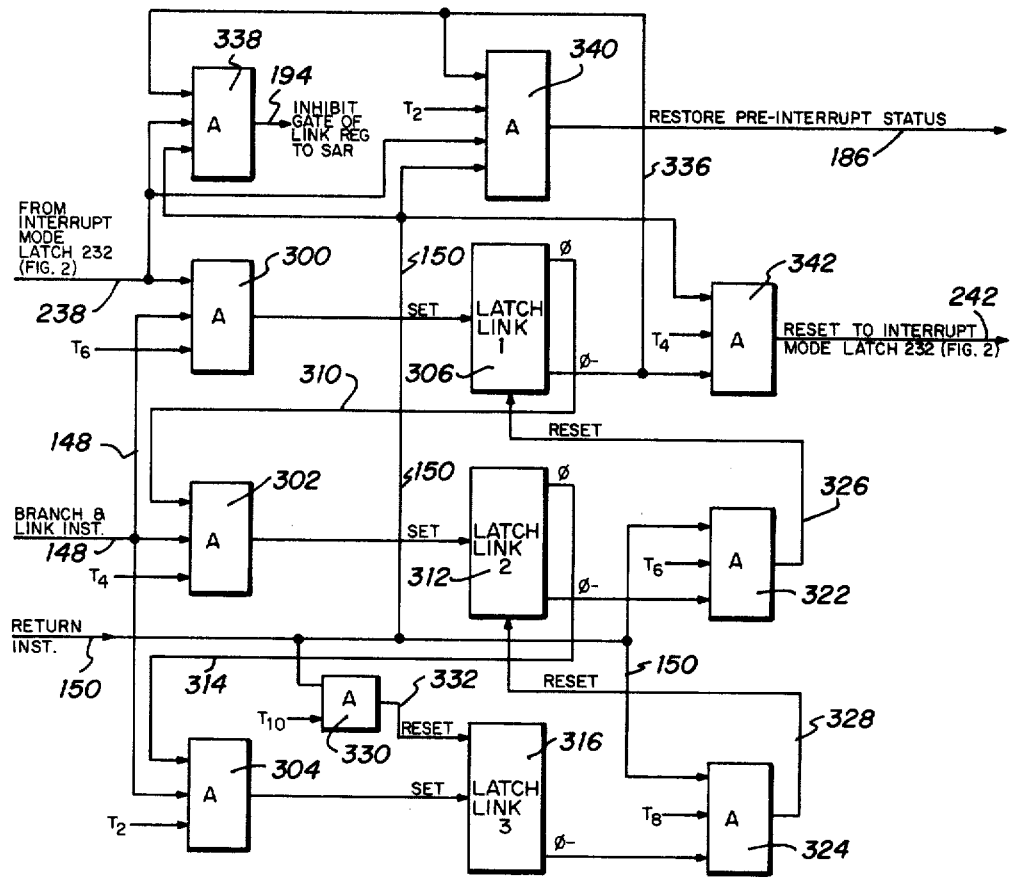
FIG. 3 is a schematic block diagram of the branch and link and return control circuit shown in the schematic block diagram of FIG. 2.

Referring to FIG. 3, branch and link and return control circuit 240 (FIG. 2) is illustrated. The output of interrupt mode latch 232 (FIG. 2) is applied via signal 238 to an AND circuit 300. Branch and Link Instructions from decoder 18 (FIG. 1) are applied to AND circuit 300 and to AND circuits 302 and 304 via signal line 148. The first time a Branch and Link Instruction is generated after an interrupt request and at Clock time $T_6$, AND circuit 300 generates an output to set a latch link 1, 306. The output of latch link 306 is applied via signal line 310 to AND circuit 302. At Clock time $T_4$, if a second Branch and Link Instruction is generated by decoder 18 (FIG. 1), AND circuit 302 will generate an output to set a latch link 2, 312. The output of latch link 312 is applied via signal line 314 to AND circuit 304. At Clock time $T_2$, if a third Branch and Link Instruction is generated by decoder 18 (FIG. 1) the output of AND circuit 304 will set a latch link 3, 316. Prior to the setting of latch link 306, at Clock times $T_2$ and $T_4$, latch links 312 and 316 will not be set as the setting of latch link 312 and latch link 316 depends on whether latch link 306 was previously set. Latch links 306, 312 and 316 when set, indicate the number of link registers 46, 50 and 54 (FIG. 1) that have been used in the interrupt routine.

When a Return Instruction is generated by decoder 18 via signal line 150 (FIG. 1), the contents of latch links 306, 312 and 316 are interrogated. At Clock time $T_2$, if interrupt mode latch 232 (FIG. 3) is set indicated by an output on signal line 238 (FIG. 3) which is applied to an AND circuit 30 and if latch link 306 has not been filled indicated by the output of latch link 306 applied via a signal line 336 to AND circuit 340 and if the Return Instruction signal is present applied via signal line 150 to AND circuit 340, AND circuit 340 generates the Restore Pre-Interrupt Status signal via signal line 186. At Clock time $T_4$, if latch links 306, 312 and 316 are not filled, an AND circuit 342 will generate the reset signal to interrupt mode latch 32 via signal line 242 (FIG. 2).

To reset latch links 306, 312 and 316, the Return Instruction signal generated by decoder 18 via signal line 150 is applied to AND circuits 322, 324 and 330. At Clock time $T_6$, if latch link 312 is not set indicating that link registers 50 and 54 (FIG. 1) are not currently being used by the interrupt routine, an output of AND circuit 322 will generate a reset signal via signal line 326 to reset latch link 306. At Clock time $T_8$ and if latch link 316 has not been previously set indicating that link register 54 (FIG. 1) is not currently being used by the interrupt routine, the output of AND circuit 324 will reset latch link 312 via signal line 328. At Clock time $T_{10}$, a Return Instruction via signal line 150 applied to an AND circuit 330 will generate a reset signal applied via signal line 332 to latch link 316 to thereby reset latch link 316. The output of latch link 306 is applied via signal line 336 to an AND circuit 338 which also receives the output of interrupt mode latch 232 (FIG. 2) via signal line 238 and the Return Instruction signal via signal line 150. AND circuit 338, if latch link 306 is reset, generates the Inhibit Gate of Link Register to SAR signal via signal line 194.

It therefore can be seen that branch and link and return control circuit 240, as illustrated in FIG. 3, functions to count the number of Branch and Link Instructions received by setting of the latch links 306, 312 and 316. When a Return Instruction is provided, latch links 306, 312 and 316 will be reset on subsequent Return Instructions. This arrangement allows for an indefinite number of Branch and Link Instructions and Return Instructions to be executed. Branch and link and return control circuit 240 will count the number of latch links 306, 312 and 316 filled as long as the number of Branch and Link Instructions is never more than three greater than the number of Return Instructions. When the number of Branch and Link Instructions equals the number of Return Instructions, link registers 46, 50 and 54 (FIG. 1) can be reloaded if data was stored in main store 12 at the beginning of the interrupt routine. When the latch links 306, 312 and 316 are all reset, the next Return Instruction will cause the contents of ILR 170 (FIG. 1) to be set into page latches 162, ALU status latches 120, 122 and 124 and SAR 26 (FIG. 1) of microprocessor 10 where the information was initially resident. Microprocessor 10 will then resume processing at the program point where the interrupt occurred. Link registers 46, 50 and 54 therefore can be reused in the interrupt routine. The loading of link registers 46, 50 and 54 does not affect the operation of branch and link and return control circuit 240 which counts the number of Branch and Link and Return Instructions during the interrupt routine.

To summarize the operation of the present invention, when an interrupt occurs from a peripheral device associated with microprocessor 10, via the External Interrupt Request signal, the contents of instruction address register 24 together with paging information stored in page latches 162 and ALU status bits of ALU status latches 120, 122 and 124 are saved and are set into ILR 170 (FIG. 1). Since it is desirable to execute Branch and Link Instructions while in the interrupt mode or interrupt subroutine, the contents of link registers 46, 50 and 54 should be emptied and saved. This storage may be accomplished, for example, by executing store link instructions.

When an interrupt is taken, interrupt mode latch 232 (FIG. 2) is set and remains set until the contents of Interrupt Link Register 170 have been restored to the registers and latches of microprocessor 10 where the information was originally held prior to occurrence of the interrupt request. When the data in one or more of link registers 46, 50 and 54 is stored in main storage unit 12 (FIG. 1) link registers 46, 50 and 54 may then be used during the interrupt routine. When Branch and Link Instructions are being executed and the interrupt mode latch 232 (FIG. 2) is set, operation of branch and link and return control circuit 240 causes latch links 306, 312 and 316 (FIG. 3) to be set and to indicate the number of link registers 46, 50 and 54 (FIG. 1) that were filled by the Branch and Link Instructions.

When a Return Instruction is provided through decoder 18 (FIG. 1) latch links 306, 312 and 316 (FIG. 3) will indicate the number of link registers 46, 50 and 54 that are filled and will be adjusted to indicate the remaining link registers 46, 50 and 54 that are filled. Branch and link and return control circuit 240 therefore allows an indefinite number of Branch and Link Instructions and Return Instructions to be executed, and will determine the number of link registers, 46, 50 and 54 filled as long as the number of Branch and Link Instructions is never more than three greater than the number of Return Instructions. When the number of Branch and Link Instructions is equal to the number of Return Instructions, link registers 46, 50 and 54 may be reloaded with the data that was stored in main storage unit 12 after the to receipt of the External Interrupt Request.

An important aspect of the present invention is that the store link and load link instructions do not set or reset latch links 306, 312 and 316 (FIG. 3) indicating that link registers 46, 50 and 54 are filled. When latch links 306, 312 and 316 are reset, the next Return Instruction will cause the contents of ILR 170 to be set into the latches and registers of microprocessor 10 where the data was initially resident prior to the interrupt. Microprocessor 10 will then resume processing at the program point where the interrupt occurred. At the completion of the interrupt subroutines, link registers 46, 50 and 54 are reloaded if their contents were stored in main storage unit 12.

It therefore can be seen that the link register system used with the present invention permits storage and reloading of existing link registers during execution of an interrupt mode of a microprocessor. The link registers can be initialized for branch and link transfers to subroutines. Hardware circuitry determines the difference in the number of Branch and Link Instructions and Return Instructions in the interrupt mode. One Return Instruction is required to control both the link registers and an interrupt link register.

Figure 4:
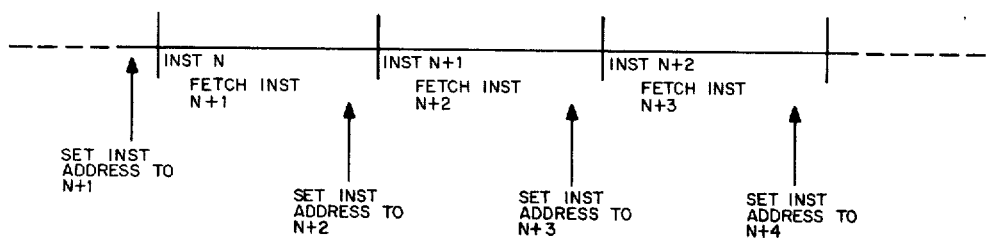
FIG. 4 is a timing diagram graphically summarizing the operation of an instruction pre-fetch microprocessor.

FIGS. 4-7 graphically illustrate various timing diagrams for the operation of the present invention. Referring initially to FIG. 4, the normal cycle operation of an instruction pre-fetch microprocessor system is illustrated. For example, during execution of instruction N, instruction N+1 is being fetched from memory such as main storage unit 12 (FIG. 1). At the completion of instruction N, the instruction address register (IAR 24) points to instruction N+2. Similarly, during execution of instruction N+1, instruction N+2 is being fetched and at the completion of instruction N+1, the instruction address register is set to the address of instruction N+3.

Figure 5:
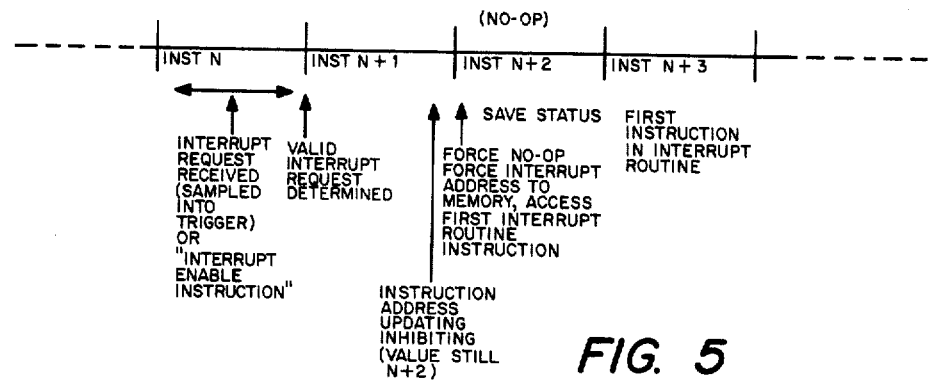
FIG. 5 is a timing diagram graphically summarizing the operation of an instruction cycle during a forced no instruction operation.

FIG. 5 illustrates the timing sequence when an interrupt has been enabled and an interrupt occurs during an instruction N or an interrupt has occurred previously and instruction N is an enable interrupt instruction. The interrupt request is received by the interrupt request latch 214 (FIG. 2). Decoder 18 (FIG. 1) generates the Enable Interrupt signal to be applied to interrupt enable latch 212 (FIG. 2) during execution of instruction N. The instruction address register 24 has been set to instruction N+1 which is being fetched from main storage unit 12. If microprocessor 10 is in the wait state, the interrupt request anded by AND circuit 216 with the output of interrupt enable latch 212 starts the system clock. The External Interrupt Request signal is clocked into interrupt request latch 214 (FIG. 2) and is sampled with the output of oscillator 22 (FIG. 1) during each microprocessor cycle and as indicated in FIG. 5, may occur at the beginning of instruction N+1. The Valid Interrupt Request signal is then generated and latched in interrupt valid latch 226. Instruction N+1 is then executed, but IAR 24 updating at the end of cycle N+1 is inhibited by operation of interrupt next instruction and IAR update latch 234 (FIG. 2). At the beginning of cycle N+2, the fixed interrupt storage address is sent to main storage unit 12 to begin fetching the first instruction in the interrupt routine. The fetching of the first instruction in the interrupt routine should occur in less than two cycles after the interrupt request was received which is an important aspect of the present invention illustrating the speed and efficiency of the present system. Also, during instruction cycle N+2, the ALU status bits stored in latches 120, 122 and 124, the contents of page latches 162 and the contents of IAR 24 which is instruction address N+2 are stored in ILR 170. Further, instruction N+2 is forced to a no operation. During instruction cycle N+3, the first instruction in the interrupt routine is executed.

Figure 6:
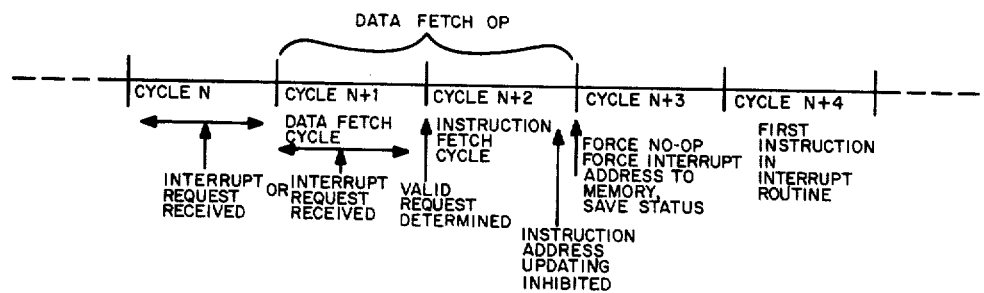
FIG. 6 is a timing diagram graphically summarizing the operation of a data fetch instruction.
Figure 7:
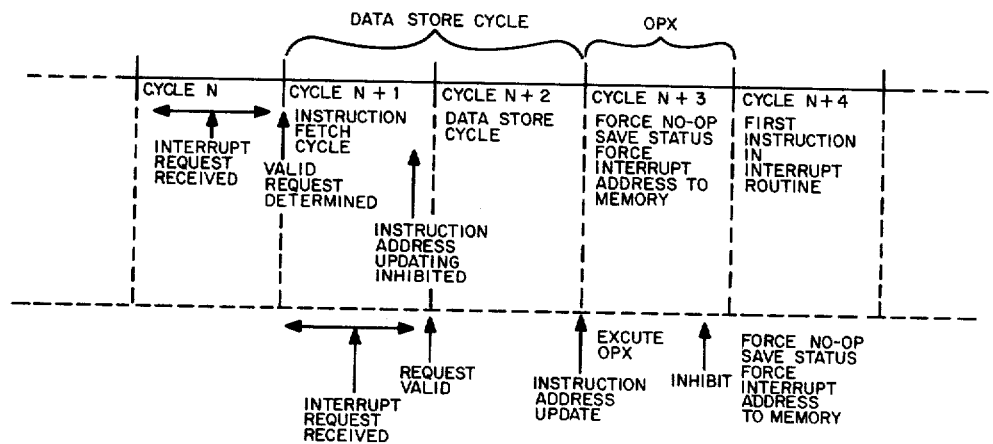
FIG. 7 is a timing diagram graphically summarizing the operation of a data store instruction.

Referring simultaneously to FIGS. 6 and 7, if instruction N+1 is a successful branch, then instruction address register 24 must be updated at the end of instruction N+1 so that the interrupt is then postponed for one cycle or until a nonsuccessful branch or other instruction is executed. Data store and data fetch instructions require two cycles since two memory references must be taken. If interrupt enable latch 212 (FIG. 2) is set and an interrupt occurs in the cycle preceding the data memory reference, the interrupt is processed as shown in FIGS. 6 and 7 in which the first instruction in the interrupt routine is executed during instruction N+4.

It therefore can be seen that the present invention provides for an extremely fast operating system in which the memory access for a first instruction in an interrupt routine occurs within two to four cycles after an interrupt request was generated if the interrupt is enabled and a series of successful branch instructions is not encountered. The present system provides for actuation of processing if the microprocessor was in a wait or stop state. Furthermore, the present system saves all pagning information which was present prior to the receipt of an External Interrupt Request and restores this data to the microprocessor at the completion of the interrupt routine. Additionally, the contents of all ALU status latches are saved and restored.

Whereas the present invention has been described with respect to specific embodiments thereof, it will be understood that various changes and modifications will be suggested to one skilled in the art, and it is intended to encompass such changes and modifications that fall within the scope of the appended claims.

What is claimed is:
1. In a data processing system which includes:
a microprocessor apparatus operable in instruction cycles between a running state wherein instructions are processed and a wait state wherein no instructions are processed by the microprocessor and wherein microprocessor instructions generate enable and disable interrupt commands, the microprocessor generating instructions for changing page information, performing storage operations, branch and link operations and return operations; a page storage unit for storing page information which is set and reset to a zero state by microprocessor instructions; a storage unit for storing data and instructions; an arithmetic and logic unit having associated status bits which are set and reset to a zero state by microprocessor instructions; a plurality of peripheral devices connected to the microprocessor, the plurality of peripheral devices generating interrupt requests to the microprocessor for operating in an interrupt cycle; and the system operating in a pre-fetch mode wherein a next succeeding instruction is fetched from the storage unit while a current instruction is being executed, an interrupt system for processing interrupt requests received by the microprocessor from the plurality of peripheral devices cmprising:

instruction address register means coupled to the storage unit for holding the next succeeding address to be pre-fetched in a sequence of instructions and operable to be updated to the value of the next succeeding address;

storage address register means coupled to said instruction address register means and coupled to the storage unit for holding the next succeeding instruction address during execution of the current instruction;

first latch means coupled to the microprocessor for receiving and storing an interrupt request received from the microprocessor and generated by one of the plurality of peripheral devices;

second latch means coupled to the storage unit and controlled by the microprocessor instructions for enabling and disabling interrupts that are received from the microprocessor when said first latch means has stored an interrupt request from the microprocessor;

interrupt link register means coupled to said instruction address register means for storing the values stored in said instruction address register means when an interrupt request is generated from one of the plurality of peripheral devices to the microprocessor;

interrupt means coupled to said first and second latch means for inhibiting the updating of the value of said instruction address register means to a next succeeding instruction to be pre-fetched during the first succeeding cycle following storage of an interrupt request by said first latch means;

means coupled to said first and second latch means and responsive to a successful branch operation resulting from the next instruction stored in said instruction address register for inhibiting operation of said interrupt means until completion of the successful branch operation; and means coupled to said first and second latch means and responsive to storage of data in the storage unit for inhibiting operation of said interrupt means until completion of the storage cycle.

2. The interrupt system of claim 1 and further including page register means coupled to said interrupt means and to said interrupt link register means for storing page information, such that said interrupt link register means stores values of said page register means stored therein when an interrupt request is generated by one of the plurality of peripheral devices to the microprocessor, transfer means coupled to said page register means and to said interrupt link register means for transferring the contents of said page register means to said interrupt link register means upon execution of an interrupt cycle by the microprocessor, and restore means coupled to said page register means and to said interrupt link register means for restoring the contents of said page register means upon completion of execution of the interrupt cycle, such that said page register means is available for use after the interrupt cycle has been completed by the microprocessor.

3. The interrupt system of claim 1 and further including arithmetic and logic unit status bits register means coupled to the arithmetic and logic unit for storing status bits, such that said interrupt link register means stores values of said arithmetic and logic unit status bits register means stored therein when an interrupt request is generated by one of the plurality of peripheral devices to the microprocessor, transfer means coupled to said arithmetic and logic unit status bits register means and to said interrupt link register means for transferring the contents of said arithmetic and logic unit status bits register means to said interrupt link register means upon execution of an interrupt cycle by the microprocessor; and restore means coupled to said arithmetic and logic unit status bits register means and to said interrupt link register means for restoring the contents of said arithmetic and logic unit status bits register means upon completion of execution of the interrupt cycle, such that said arithmetic and logic unit status bits register means is available for use after the interrupt cycle has been completed by the microprocessor.

4. The interrupt system of claim 1 wherein said interrupt means includes means for forcing an interrupt address from the storage unit to said storage address register means for accessing the next instruction from the storage unit for use in the next succeeding cycle of the microprocessor.

5. The interrupt system of claim 1 wherein said interrupt means includes means for storing in said interrupt link register the instruction address and page information stored in the page storage unit when the interrupt was executed by the microprocessor.

6. The interrupt system of claim 1 wherein said interrupt means includes means for storing in said interrupt link register the arithmetic and logic unit status bits stored in the arithmetic and logic unit when the interrupt was executed by the microprocessor.

7. The interrupt system of claim 1 wherein said interrupt means includes means for resetting of the contents of the page information stored in the page storage unit to a zero state.

8. The interrupt system of claim 1 wherein said interrupt means includes means for resetting of the contents of the arithmetic and logic unit status bits stored in the arithmetic and logic unit to a zero state.

9. The interrupt system of claim 1 wherein the microprocessor includes clock means and further includes:

means for actuating the microprocessor clock means when an interrupt request occurs and the interrupt request has been enabled when the microprocessor is in the wait state.

10. In a data processing system which includes:
a microprocessor apparatus operable in instruction cycles between a running state wherein instructions are processed and a wait state wherein no instructions are processed by the microprocessor and wherein microprocessor instructions generate enable and disable interrupt commands, the microprocessor generating instructions for changing page information, performing storage operations, branch and link operations and return operations; a page storage unit for storing page information which is set and reset to a zero state by microprocessor instructions; a storage unit for storing data and instructions; an arithmetic and logic unit having associated status bits which are set and reset to a zero state by microprocessor instructions; a plurality of peripheral devices connected to the microprocessor, the plurality of peripheral devices generating interrupt requests to the microprocessor for operating in an interrupt cycle; and the system operating in a pre-fetch mode wherein a next succeeding instruction is fetched from the storage unit while a current instruction is being executed, an interrupt system for processing interrupt requests received by the microprocessor from the plurality of peripheral devices comprising:

instruction address register means coupled to the storage unit for holding the next succeeding address to be pre-fetched in a sequence of instructions and operable to be updated to the value of the next succeeding address;

storage address register means coupled to said instruction address register means and coupled to the storage unit for holding the next succeeding instruction address during execution of the current instruction;

first latch means coupled to the microprocessor for receiving and storing an interrupt request received from the microprocessor and generated by one of the plurality of peripheral devices;

second latch means coupled to the storage unit and controlled by the microprocessor instructions for enabling and disabling interrupts that are received from the microprocessor when said first latch means has stored an interrupt request from the microprocessor;

interrupt link register means coupled to said instruction address register means for storing the values stored in said instruction address register means and for storing page information stored in the page storage unit when an interrupt request is generated from one of the plurality of peripheral devices to the microprocessor;

interrupt means coupled to said first and second latch means for inhibiting the updating of the value of said instruction address register means to a next succeeding instruction to be pre-fetched during the first succeeding cycle following storage of an interrupt request by said first latch means;

said interrupt means includes means for forcing an interrupt address from the storage unit to said storage address register means for accessing the next instruction from the storage unit for use in the next succeeding cycle of the microprocessor;

said interrupt means includes means for storing in said interrupt link register the instruction address and page information stored in the page storage unit when the interrupt was executed by the microprocessor;

said interrupt means includes means for storing in said interrupt link register the arithmetic and logic unit status bits stored in the arithmetic and logic unit when the interrupt was executed by the microprocessor;

means coupled to said first and second latch means and responsive to a successful branch operation resulting from the next instruction stored in said instruction address register for inhibiting operation of said interrupt means until completion of the successful branch operation; and means coupled to said first and second latch means and responsive to storage of data in the storage unit for inhibiting operation of said interrupt means until completion of the storage cycle.

11. The interrupt system of claim 10 wherein said interrupt link register means stores values of the arithmetic and logic unit status bits stored in the arithmetic and logic unit when an interrupt request occurs from one of the plurality of peripheral devices to the microprocessor.

12. The interrupt system of claim 11 wherein said interrupt means includes means for resetting of the contents of the arithmetic and logic unit status bits stored in the arithmetic and logic unit to a zero state.

13. The interrupt system of claim 12 wherein said interrupt means includes means for resetting of the contents of the page information stored in the page storage unit to a zero state.

14. The interrupt system of claim 13 wherein the microprocessor includes clock means and further includes:
means for actuating the microprocessor clock means when an interrupt request occurs and the interrupt request is enabled when the microprocessor is in the wait state.

15. The interrupt system of claim 10 and further including:
a plurality of register means for storing information coupled to said interrupt means;
transfer means coupled to said plurality of register means and said interrupt link register means for transferring said information stored in said plurality of register means to said interrupt link register means upon the execution of an interrupt cycle by the microprocessor;
restore means coupled to said plurality of register means and said interrupt link register means for restoring said information stored in said plurality of register means upon completion of execution of the interrupt cycle, such that said plurality of register means are available for use after the interrupt cycle has been completed by the microprocessor;
means coupled to said interrupt means for recording each execution of each branch and link instruction and each return instruction generated by the microprocessor from the storage unit while the microprocessor operates in the interrupt cycle; and
means coupled to said interrupt means for determining the difference in the number of branch and link instructions and return instructions generated by the microprocessor, such that when the number of return instructions is greater than the number of branch and link instructions the interrupt cycle is completed and, the return instruction causes the information stored in said plurality of register means to be automatically restored from said interrupt link register means to said plurality of register means.

16. The interrupt system of claim 15 wherein said plurality of register means includes page register means for storing page information, such that said interrupt link register means stores values of said page register means stored therein when an interrupt request occurred from one of the plurality of peripheral devices to the microprocessor; said transfer means transfers the contents of said page register means to said interrupt link register means upon initiation of an interrupt cycle; and said restore means restores the contents of said page register means upon completion of execution of the interrupt cycle, such that said page register means is available for use after the interrupt cycle has been completed by the microprocessor.

17. The interrupt system of claim 15 wherein said plurality of register means includes arithmetic and logic unit status bits register means for storing status bits, such that said interrupt link register means stores values of said arithmetic and logic unit status bits register means stored therein when an interrupt request occurred from one of the plurality of peripheral devices to the microprocessor; said transfer means transfers the contents of said arithmetic and logic unit status bits register means to said interrupt link register means upon initiation of an interrupt cycle; and said restore means restores the contents of said arithmetic and logic unit status bits register means upon completion of execution of the interrupt cycle; such that said arithmetic and logic unit status bits register means is available for use after the interrupt cycle has been completed by the microprocessor.

18. In a data processing system which includes:
a microprocessor apparatus operable in instruction cycles between a running state wherein instructions are processed and a wait state wherein no instructions are processed by the microprocessor and wherein microprocessor instructions generate enable and disable interrupt commands, the microprocessor generating instructions for changing page information, performing storage operations, branch and link operations and return operations; a page storage unit for storing page information which is set and reset to a zero state by microprocessor instructions; a storage unit for storing data and instructions; an arithmetic and logic unit having associated status bits which are set and reset to a zero state by microprocessor instructions; a plurality of peripheral devices connected to the microprocessor, the plurality of peripheral devices generating interrupt requests to the microprocessor for operating in an interrupt cycle; and the system operating in a pre-fetch mode wherein a next succeeding instruction is fetched from the storage unit while a current instruction is being executed, an interrupt system for processing interrupt requests received by the microprocessor from the plurality of peripheral devices comprising:
instruction address register means coupled to the storage unit for holding the next succeeding address to be pre-fetched in a sequence of instructions and operable to be updated to the value of the next succeeding address;
storage address register means coupled to said instruction address register means and coupled to the storage unit for holding the next succeeding instruction address during execution of the current instruction;
first latch means coupled to the microprocessor for receiving and storing an interrupt request received from the microprocessor and generated by one of the plurality of peripheral devices;
second latch means coupled to the storage unit and controlled by the microprocessor instructions for enabling and disabling interrupts that are received from the microprocessor when said first latch means has stored an interrupt request from the microprocessor;
interrupt link register means coupled to said instruction address register means for storing the values stored in said instruction address register means when an interrupt request is generated from one of the plurality of peripheral devices to the microprocessor;
interrupt means coupled to said first and second latch means for inhibiting the updating of the value of said instruction address register means to a next succeeding instruction to be pre-fetched during the first succeeding cycle following storage of an interrupt request by said first latch means;
means coupled to said first and second latch means and responsive to a successful branch operation resulting from the next instruction stored in said instruction address register for inhibiting operation of said interrupt means until completion of said successful branch operation;
means coupled to said first and second latch means and responsive to storage of data in the storage unit for inhibiting operation of said interrupt means until completion of the storage cycle;
transfer means coupled to said instruction address register means and to said interrupt link register means for transferring the contents of said instruction address register means to said interrupt link register means upon the processing of an interrupt cycle by the microprocessor;
restore means coupled to said intruction address register means and to said interrupt link register means for restoring the contents of said instruction address register means upon completion of execution of the interrupt cycle, such that said instruction address register means is available for use after the interrupt cycle has been completed by the microprocessor;
means coupled to said interrupt means for recording each execution of each branch and link instruction and each return instruction generated by the microprocessor from the stroage unit while the microprocessor operates in the interrupt cycle; and
means coupled to said interrupt means for determining the difference in the number of branch and link instructions and return instructions generated by the microprocessor, such that when the number of return instructions is greater than the number of branch and link instructions the interrupt cycle is completed and the return instruction causes the information stored in said interrupt link register means to be automatically restored from said interrupt link register means to said instruction address register.

19. The interrupt system of claim 18 wherein said interrupt means includes means for forcing an interrupt address from the storage unit to said storage address register means for accessing the next instruction from the storage unit for use in the next succeeding cycle of the microprocessor.

20. The interrupt system of claim 19 wherein said interrupt means includes means for storing in said interrupt link register the instruction address and page information stored in the page storage unit when the interrupt was executed by the microprocessor.

21. The interrupt system of claim 20 wherein said interrupt means includes means for storing in said interrupt link register the arithmetic and logic unit status bits stored in the arithmetic and logic unit when the interrupt was executed by the microprocessor.

22. The interrupt system of claim 20 wherein said interrupt means includes means for resetting of the contents of the page information stored in the page storage unit to a zero state.

23. The interrupt system of claim 20 wherein said interrupt means includes means for resetting of the contents of the arithmetic and logic unit status bits stored in the arithmetic and logic unit to a zero state.

24. The interrupt system of claim 20 wherein the microprocessor includes clock means and further includes:

means for actuating the microprocessor clock means when an interrupt request occurs and the interrupt request has been enabled when the microprocessor is in the wait state.

* * * * *

UNITED STATES PATENT AND TRADEMARK OFFICE
CERTIFICATE OF CORRECTION

PATENT NO. : 4,279,016

DATED : July 14, 1981

INVENTOR(S) : Joel C. Leininger; Floyd R. Bliss; Peter T. Fairchild

It is certified that error appears in the above—identified patent and that said Letters Patent is hereby corrected as shown below:

Column 4, line 59, change "60" to --80--;
Column 7, line 31, after "signal" insert --line--;
        line 57, change "30" to --340--;
        line 65, change "32" to --232--;
Column 9, line 25, after "the" delete "to";
Column 10, line 53, change "pagning" to --paging--;
Column 11, line 22, change "cmprising" to --comprising--;
Column 16, line 53, change "stroage" to --storage--.

Signed and Sealed this

Eighth Day of December 1981

[SEAL]

Attest:

Attesting Officer

GERALD J. MOSSINGHOFF
Commissioner of Patents and Trademarks